March 3, 1931. M. P. DOUGLASS 1,794,676
TRACTION DEVICE FOR TIRES
Filed Dec. 14, 1929
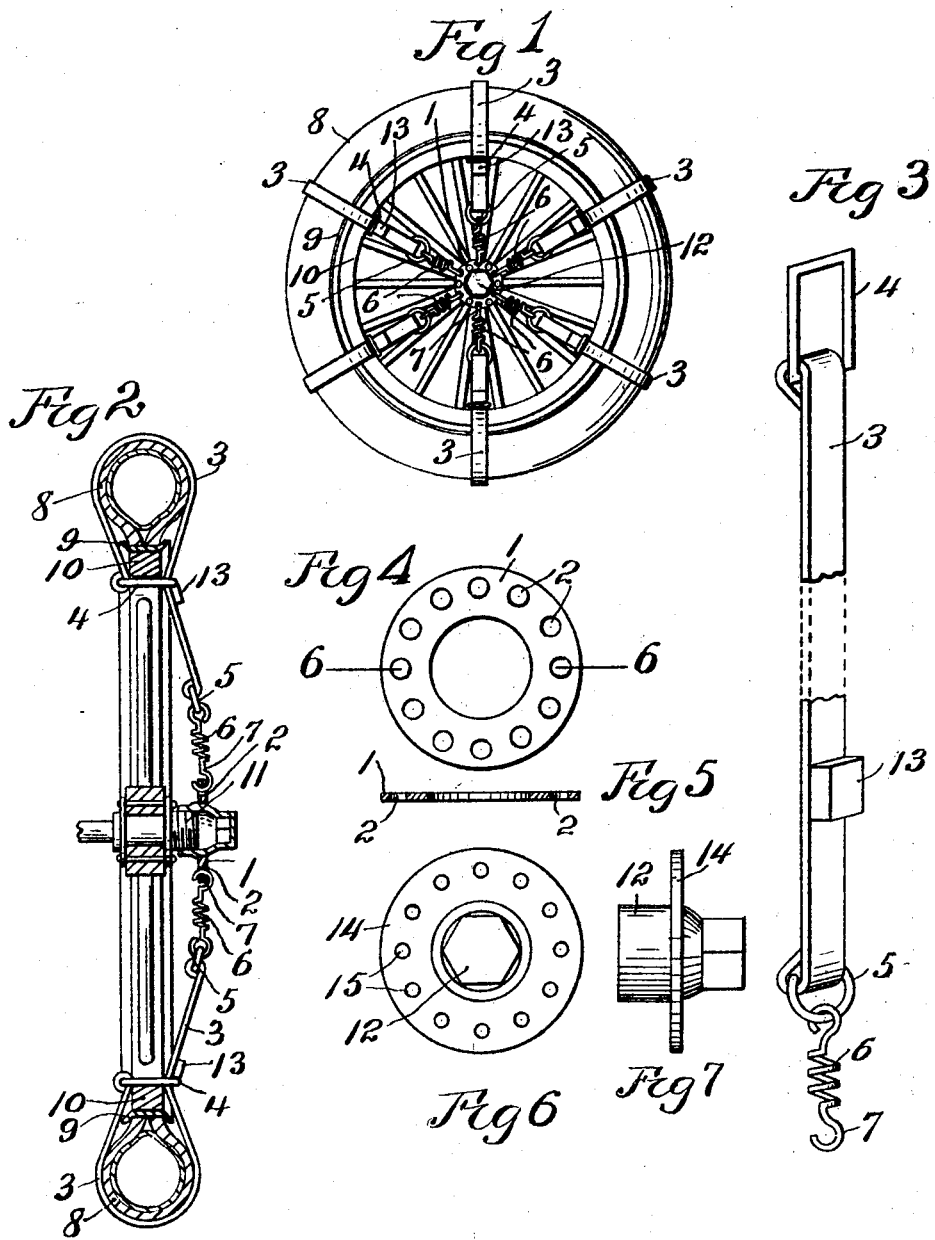
INVENTOR.
Mabel P. Douglass
BY Warren W. House
Her ATTORNEY
Witness
H. Vernon Olson Patented Mar. 3, 1931

1,794,676

UNITED STATES PATENT OFFICE

MABEL P. DOUGLASS, OF LATHROP, MISSOURI

TRACTION DEVICE FOR TIRES

Application filed December 14, 1929. Serial No. 414,039.

My invention relates to improvements in traction devices for tires. It relates particularly to emergency traction devices adapted for application to the tires of automobiles for increasing the wheel traction and to prevent or reduce skidding.

A further object of my invention is to provide a novel traction device for tires which is simple, cheap to make, durable, not likely to get out of order, which is quickly and easily applied to a vehicle wheel without having to jack up the wheel, and which is efficient in operation.

The novel features of my invention are hereinafter fully described and claimed.

In the accompanying drawing, which illustrates my invention,

Fig. 1 is a reduced side elevation of an automobile wheel of common type provided with my improved traction device, having an anchor ring adapted to encircle a hub cap.

Fig. 2 is an enlarged central vertical sectional view of the same.

Fig. 3 is an enlarged perspective view of one of the straps with attached spring and link.

Fig. 4 is a plan view of the anchoring ring, enlarged.

Fig. 5 is a section on the line 5—5 of Fig. 4.

Fig. 6 is a front elevation of a modification of the anchoring means, in which the hub cap is provided with an annular peripheral perforated flange, which effects the functions of the anchoring ring shown in Fig. 4.

Fig. 7 is a side elevation of the hub cap shown in Fig. 6.

Similar reference characters designate similar parts in the different views.

Referring to Figs. 1 to 5, my improvement provides anchoring means adapted to be mounted on and anchored to a wheel, and which in its preferred form comprises a ring 1 adapted to encircle a wheel hub and having therethrough a circular row of holes 2.

For releasable attachment to the ring 1, I provide a plurality of flexible resilient devices, each consisting, preferably, of a strap 3, of rubber, rubber fabric, leather, or other suitable material, to one end of which is fastened a link 4, Fig. 3, through which is adapted to be reeved the other end portion of the strap 3, to which other end portion is attached a ring 5 having attached to it one end of a coil spring 6, the other end of which has a hook 7 adapted to releasably engage the anchoring ring 1 by being inserted through one of the holes 2 thereof.

The strap 3 is adapted to encircle the tire 8, rim 9 and felly 10 of an automobile wheel, the hub 11 of which is encircled by the ring 1, which is slipped over the hub cap 12.

As shown in Figs. 1 and 2, the strap 3 is made to encircle the tire 8, rim 9 and felly 10, the spring 6, ring 5 and adjacent end portion of the strap being reeved through the ring 4.

To the outer side of the strap 3 is attached a block 13 of material corresponding to that of the strap, or other suitable material, said block constituting an abutment, which is passed through the link 4, and is so disposed that, when the strap 3 is drawn tightly against the tire 8, it will engage the adjacent end of the ring 4 at the side of the latter next to the hub, as shown in Fig. 2, so as to hold the ring 4 from slipping on the strap 3 toward the spring 6 but which will permit the spring to pull the strap toward the hub to tighten the strap on the tire. The hook 7 is then inserted through the adjacent hole 2 of the ring 1.

The straps 3 of the other flexible resilient devices are made, in like manner, to embrace the tire 8 at different places respectively around the circumference of the tire. The straps 3 are drawn tightly through the links 4 respectively until the abutments 13 thereof respectively engage the links 4, as shown in Figs. 1 and 2.

The hooks 7 are then respectively inserted through the adjacent holes 2 of the anchoring ring 1. This completes the assembling of the traction device upon a wheel. The straps 3 where they cover the tread portion of the tire will effect the function of the usual tire chain, if affording good traction for the wheel on slippery surfaces or in the mud.

In the form shown in Figs. 6 and 7, the anchoring ring is integral with the hub cap 12, the latter being provided with an annular peripheral flange 14 provided with a circular row of transverse holes 15 corresponding in function to the holes 2 of the ring 1, being adapted to respectively receive the hooks 7 of the springs 6, after the straps 3 have been mounted on the tire as has been already described.

The springs 6 are sufficiently strong to hold the straps 3 tightly on the tire.

I do not limit my invention to the structures shown and described, as many modifications, within the scope of the appended claim, may be made without departing from the spirit of my invention.

What I claim is:—

A traction device for tires comprising anchoring means adapted to encircle a wheel hub, a strap adapted to embrace a tire and rim, said strap having on one side an abutment, a link attached to one end of said strap and adapted to have said strap and said abutment reeved therethrough, said abutment being adapted to engage the side only of the link next to the hub and hold said link from slipping in one direction, but permitting the strap to be drawn toward the hub to tighten the strap on the tire, and means, including a coil spring, attached to the other end of said strap and adapted for insertion through said link, and having means adapted for releasable attachment to said anchoring means and normally drawing said strap toward said hub.

In testimony whereof I have signed my name to this specification.

MABEL P. DOUGLASS.